United States Patent
Krenz et al.

(10) Patent No.: US 8,829,707 B2
(45) Date of Patent: Sep. 9, 2014

(54) METHODS FOR AIRCRAFT EMERGENCY POWER MANAGEMENT

(75) Inventors: Michael Krenz, Roscoe, IL (US); Carl A. Wagner, Beloit, WI (US); David L. Jacques, Caledonia, IL (US); Adam M. Finney, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 316 days.

(21) Appl. No.: 12/836,601

(22) Filed: Jul. 15, 2010

(65) Prior Publication Data

US 2012/0013177 A1    Jan. 19, 2012

(51) Int. Cl.
*B60L 1/00* (2006.01)
*H02J 4/00* (2006.01)
*H02J 3/14* (2006.01)
*H02J 1/14* (2006.01)

(52) U.S. Cl.
CPC .... *H02J 4/00* (2013.01); *H02J 3/14* (2013.01); *B64D 2221/00* (2013.01); *H02J 1/14* (2013.01)
USPC ............................................. 307/9.1

(58) Field of Classification Search
USPC ............... 322/8; 307/9.1; 700/292, 293, 295; 701/3
See application file for complete search history.

(56) References Cited

U.S. PATENT DOCUMENTS

| | | | |
|---|---|---|---|
| 3,379,893 A | 4/1968 | Cavanaugh | |
| 4,403,292 A | 9/1983 | Ejzak et al. | |
| 4,864,812 A | 9/1989 | Rodgers et al. | |
| 4,979,362 A | 12/1990 | Vershure, Jr. | |
| 5,466,974 A | 11/1995 | Sutrina et al. | |
| 5,583,419 A * | 12/1996 | Haller | 322/8 |
| 5,899,411 A | 5/1999 | Latos et al. | |
| 5,939,800 A * | 8/1999 | Artinian et al. | 307/64 |
| 6,344,700 B1 | 2/2002 | Eisenhauer et al. | |
| 6,346,892 B1 | 2/2002 | DeMers et al. | |
| 6,739,556 B1 | 5/2004 | Langston | |
| 7,634,329 B2 * | 12/2009 | Liu et al. | 700/292 |
| 8,432,059 B2 * | 4/2013 | Waite et al. | 307/9.1 |
| 2002/0128759 A1 * | 9/2002 | Sodoski et al. | 701/36 |
| 2009/0103221 A1 * | 4/2009 | Aronson et al. | 361/93.2 |
| 2010/0152914 A1 * | 6/2010 | Ying | 700/295 |
| 2011/0184579 A1 * | 7/2011 | Nilsen et al. | 700/295 |
| 2012/0173033 A1 * | 7/2012 | Tischer | 700/295 |

* cited by examiner

*Primary Examiner* — Daniel Cavallari
(74) *Attorney, Agent, or Firm* — Carlson, Gaskey & Olds, PC

(57) ABSTRACT

A method for controlling an aircraft power system having a plurality of generators includes determining a load set for controlling aircraft power as a function of a number of generators providing power and as a function of a health status of a load to be included in said load set.

25 Claims, 2 Drawing Sheets

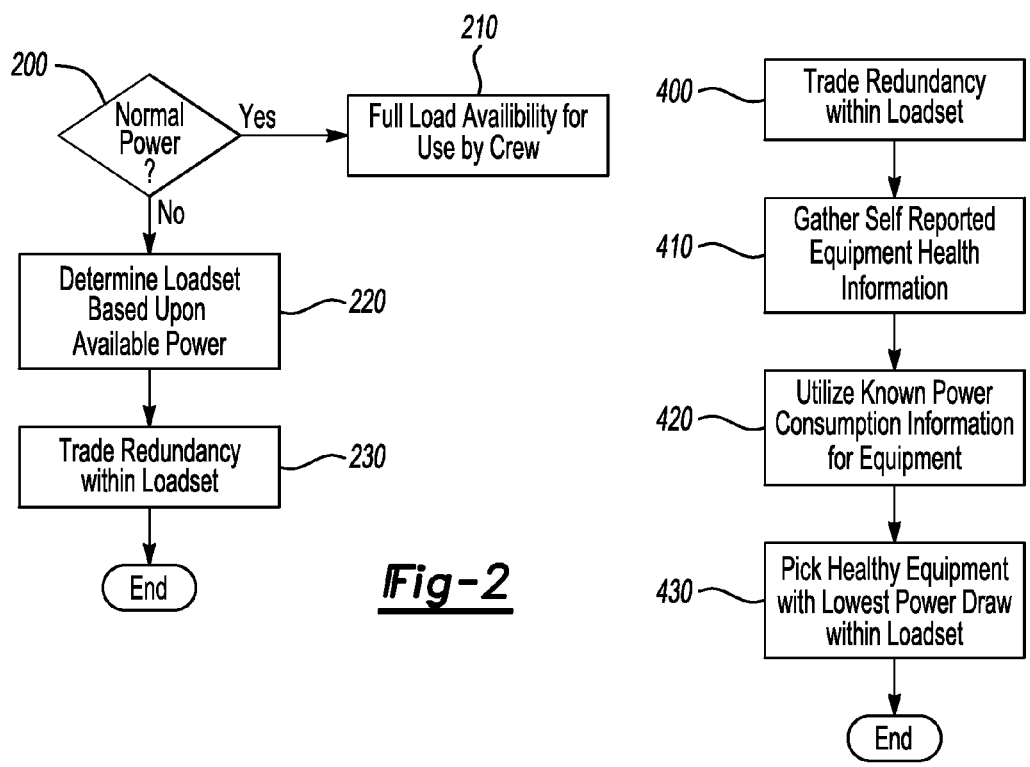
*Fig-2*
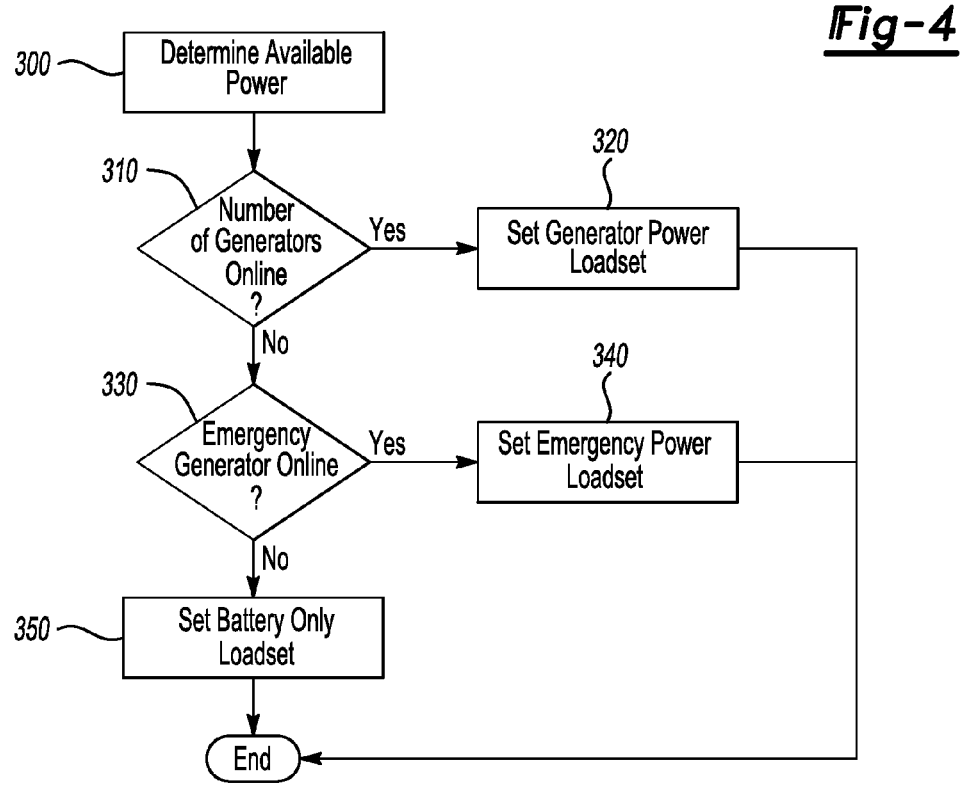
*Fig-4*
*Fig-3*

METHODS FOR AIRCRAFT EMERGENCY POWER MANAGEMENT

BACKGROUND OF THE INVENTION

Aircraft are complex and use a vast array of electrical devices such as sensors, weapon systems (for military aircraft) and cockpit displays. Other devices include environmental systems, flight controls, galley equipment, communication gear, weather radar, in-flight entertainment systems, external lighting, etc. Typically, DC power supplies, such as batteries, are insufficient to meet the demands for electricity in operating these devices.

Aircraft are equipped with a number of power generation systems including primary and redundant backup systems to supply power to equipment in an emergency. Primary power is usually provided by AC generators directly connected to the gas turbine engines. Commercial aircraft and many military aircraft are equipped with auxiliary power units (APU), essentially smaller gas turbine engines, which provide an additional power source. The APU supplements the primary power system or replaces it in case of engine failure. If the APU fails, many aircraft carry a ram air turbine (RAT) that can be deployed when needed to provide emergency power to keep critical systems operating long enough to land safely. Some aircraft may also have battery backups.

SUMMARY OF THE INVENTION

According to an example provided herein, a method for controlling an aircraft power system having a plurality of generators includes determining a load set for controlling aircraft power as a function of a number of generators providing power and as a function of a health status of a load to be included in said load set.

According to a further example provided herein an apparatus includes a load panel that determines a load set for controlling aircraft power as a function of a number of functioning power sources and as a function of a health status of a load to be included in the load set. The load panel provides power to loads within the load set.

These and other features of the present invention can be best understood from the following specification and drawings, the following of which is a brief description.

BRIEF DESCRIPTION OF THE DRAWINGS

FIG. 2 shows a method of power distribution to load sets.

FIG. 3 shows a method of power distribution from aircraft power sources

FIG. 4 shows a method of picking loads during a reduction in power in an aircraft.

DETAILED DESCRIPTION OF THE PREFERRED EMBODIMENT

Figure 1:
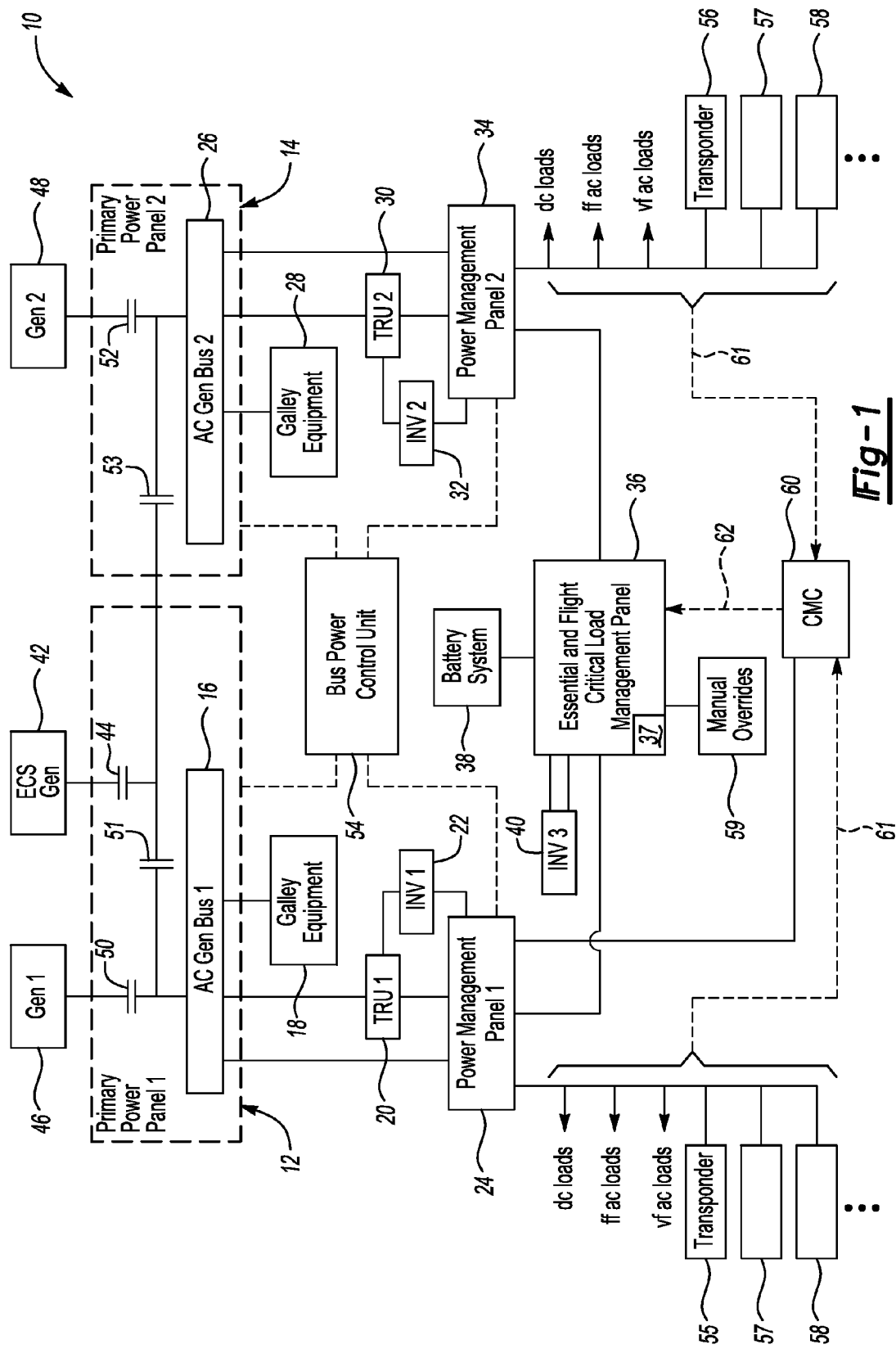
FIG. 1 shows an illustrative electrical system for an aircraft.

FIG. 1 shows an electrical power system 10 for an aircraft (not shown). The system 10 includes first and second primary power panels 12 and 14, which provide primary power distribution to the aircraft. The first primary power panel 12 includes a first ac generator bus 16, which includes conductors such as copper wires (not shown) embedded in a hull of an aircraft (not shown) and buried under panels (not shown) in an aircraft cabin (not shown). The first ac generator bus 16 receives ac power at variable frequencies and supplies the variable frequency ac power to frequency insensitive galley equipment 18 such as galley ovens and chillers. The first ac generator bus 16 also supplies variable frequency ac power to a first transformer-rectifier unit ("TRU") 20, which steps down the ac power and converts the stepped down power to dc power. A first static inverter 22 converts dc power from the first TRU 20 into fixed frequency ac power. The fixed frequency ac power from the inverter 22, the dc power from the first TRU 20 and the variable frequency ac power from the first ac generator bus 16 are supplied to a first power management panel 24. The first power management panel 24 includes a plurality of power relays that can be controlled manually or automatically to provide secondary power distribution to the aircraft. The first power management panel 24 distributes fixed frequency ac power to loads such as hydraulic pumps, fuel pumps, environmental controls, recirculation fans and galley fans. Further, the first power management panel 24 distributes dc power to loads such as communication and navigation equipment and dc instrumentation and electronics. Still further, the first power management panel 24 distributes variable frequency ac power to loads such as ac lighting, gasper fans, and ice and rain protection equipment. The first power management panel 24 also includes a plurality of circuit breakers for line and load fault protection.

The second primary power panel 14 includes a second ac generator bus 26, which provides variable frequency ac power to additional galley equipment 28, a second TRU 30 and second power management panel 34. A second static inverter 32 converts dc power from the second TRU 30 into fixed frequency ac power. The second power management panel 34 provides secondary power distribution of variable frequency ac power from second ac generator bus 26, dc power from the second TRU 30 and fixed frequency ac power from the second inverter 32. The second primary power panel 14, the second TRU 30, the second inverter 32 and the second power management panel 34 can provide system redundancy, which increases reliability of the system 10.

The ac generator buses 16 and 26 handle ac power having a limited range of frequencies. For example, the frequency of the ac power can be between 400 Hz and 800 Hz. Powering certain equipment at variable frequencies and other equipment at a fixed frequency allows the size and weight of the static inverters 22 and 32 to be reduced because the static inverters 22 and 32 do not have to supply ac power to all of the equipment. For certain aircraft, the static inverters 22 and 32 may be reduced in size by as much as 70 percent.

An Essential and Flight Critical Load Management Panel 36 provides ac and dc power to selected flight instruments and other critical dc or ac loads in the event primary power is lost. The dc power may be supplied by a battery system 38, and the ac power may be supplied by a combination of the battery system 38 and a third static inverter 40. The third static inverter 40 converts the dc power from the battery system 38 to fixed frequency ac power.

Primary power is supplied to either the first or second ac generator bus 16 or 26 by an auxiliary generator 42. The auxiliary generator may be a generator, an APU, a RAT or similar device or any combination thereof (hereinafter referred to as "ECS"). An ECS generator 42 is operable to provide appropriate power as required by the system 10. Having a four-pole design and a maximum speed of 24000 rpm, for example, the ECS generator 42 can produce ac power having a frequency between 400 Hz and 800 Hz. The ECS generator 42 is sized to provide full bus loads at all times to either the first or second ac generator bus 16 or 26. During normal operating conditions, the ECS generator 42 is selectively connected to one of the first and second ac generator buses 16 and 26 by a first power relay 44 and either a second or third power relay 51 or 53.

Primary power is supplied to the other of the first and second ac generator buses 16 and 26 by closing either a fourth of fifth power relay 50 or 52 to connect one of the aircraft's two main engine generators 46 or 48. When backup power is needed for the ECS generator 42, the main engine generators 46 and 48 are connected to the first and second generator buses 16 and 26, respectively, by closing the fourth and fifth power relays 50 and 52 and opening the first power relay 44. Typically, there will be a main engine generator 46 or 48 corresponding to each main engine of the aircraft, and an ac generator bus 16 or 26 corresponding to each main engine generator 46 or 48. Each main engine generator 46 and 48 is operable to provide ac power having a limited frequency range. With a 4-pole design and a maximum speed of 24000 rpm, each main engine generator 46 and 48 can operate between 50% and 100% of maximum speed and produce ac power between 400 Hz and 800 Hz. Though relays are defined herein, other types of switches including contactors and solid state devices etc. are also contemplated herein.

Such an electrical power system 10 offers increased reliability due to the additional redundancy between the main engine generators 46 and 48 and the ECS generator 42. Such an electrical power system 10 also reduces aircraft fuel consumption because the ECS generator 42, not a main engine generator 46 or 48, is providing primary ac power to one of the ac generator buses 16 or 26.

The electrical power system 10 further includes a bus power control unit ("BPCU") 54 for controlling the power relays 44, 50, 51, 52 and 53 to connect either the ECS generator 42 or one of the main engine generators 46 and 48 to the first and second ac generator buses 16 and 26. In addition to controlling the power relays 44, 50, 51, 52 and 53, the BPCU 54 controls the relays in the first and second power management panels 24 and 34 and the Essential and Flight Critical Load Management Panel 36. The power management panels 24, 34 send the appropriate power to redundant transponders 55, 56 and other loads 57, 58 which may also be redundant. The Essential and Flight Critical Load Management Panel 36 may also have a manual override 59.

A central maintenance controller ("CMC") 60, which may be a part of the BPCU 54, communicates with the dc loads, fixed frequency (ff) ac loads, the variable frequency (vf) ac loads, transponders 55, 56 and other loads 57, 58 via signal lines 61 and communicates with the Essential and Flight Critical Load Management Panel 36 via signal line 62 as will be discussed herein.

Referring now to FIG. 2, operation of the Essential and Flight Critical Load Management Panel 36 is described. If there is a normal power situation (e.g., all power sources are operating properly) (see step 200), a full load is available for use by the crew (see step 210). If normal power is not available, the Essential and Flight Critical Load Management Panel 36 includes a processor 37 to run an instruction set to determine a required load set based on available power step (see step 220), then trade redundancy within the load set (step 230). For instance, if the Essential and Flight Critical Load Management Panel 36 includes an electrical load such as a transponder 55 (there is usually only one on the Essential and Flight Critical Load Management Panel 36) that is on standby power if an emergency occurs, the Essential and Flight Critical Load Management Panel 36 sheds powering the transponder 55 by turning off power thereto in the panel and maintains powering and communicating with the powered transponder 56.

FIG. 3 illustrates an example process for performing step 220 of FIG. 2. The Essential and Flight Critical Load Management Panel 36 includes a processor 37 to run an instruction set that determines available power (step 300). The Essential and Flight Critical Load Management Panel 36 determines how many generators (e.g., main engine generators 46, 48 and ECS generator(s) 42 are on-line (step 310) and creates a given load set (step 320) for the number of generators still on-line. For instance, if two of the three generators 42, 46, 48 are on line, a load set for that generator may include flight controls, cockpit displays, environmental systems, flight controls, galley equipment, communication gear, weather radar, and external lighting. The selection criteria is based on a weighting of criticality versus power required by load. If the ECS generator 42 is on-line (step 330) the load set may be determined by Essential and Flight Critical Load Management Panel 36 (step 340) to include flight controls, communication gear, weather radar, and external lighting. If there are no generators on-line (step 350), the Essential and Flight Critical Load Management Panel 36 determines a battery-only load set which may include flight controls and communication gear. Power is then distributed by Essential and Flight Critical Load Management Panel 36 with the load sets that have been determined.

FIG. 4 illustrates an example process for performing step 230 of FIG. 2. After redundancy has been shed (step 400), the Essential and Flight Critical Load Management Panel 36 gathers reported equipment health information (step 410) from CMC 60, utilizes known power consumption information for equipment that is functional (step 420) and then chooses to run the healthy (e.g., undamaged) equipment with the lowest power draw within the load set (step 430). For example, if a load, such as transponder 56 is not functioning (i.e., unhealthy), a health status assessment can be performed by power management panels 24, 34, which communicate with the essential and flight critical load management panel 36 comparing known power consumption of the transponder 56 with actual power consumption or the like from transponder 56, and a standby transponder 55 may be placed on Essential and Flight Critical Load Management Panel 36 and powered while the transponder 56 that is not healthy is removed from Essential and Flight Critical Load Management Panel 36 and not powered. Similarly, unhealthy flight instrumentation may be shed and back-up flight instrumentation may be integrated into a primary flight display. The equipment health assessment may either be internally generated, i.e., the component being powered has reported a health problem to the CMC 60, or externally generated, i.e., the component being powered is not acting normally. For example, the component may be using too much power, too little power, is not responding as instructed, or can't be "heard" (i.e., not detected) by the CMC 60.

The Essential and Flight Critical Load Management Panel 36 may be manually overridden by manual overrides 59 if functionality is needed. For instance, if emergency power to control flaps (not shown) to safely land the aircraft is required, any load set not including flap control may be overridden to enable power to be provided for flap control.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for controlling an aircraft power system having a plurality of electrical power sources, said method comprising:
   determining a load set for controlling aircraft power based on a number of sources;
   determining a health status of a load within said load set, said health status indicative of whether said load is malfunctioning; and
   providing power to only those loads within said load set that are not deemed to be malfunctioning.

2. The method of claim 1 further comprising:
   removing an unpowered redundant first load from said load set.

3. The method of claim 2 further comprising:
   adding a powered first load to said load set.

4. The method of claim 1 further comprising:
   shedding a powered redundant load from said load set.

5. The method of claim 1 further comprising:
   adding one or more properly functioning loads with the lowest power draw to said load set.

6. The method of claim 1, further comprising manually overriding one or more loads within said load set.

7. A method for controlling an aircraft power system having a plurality of electrical power sources, said method comprising:
   determining a load set for receiving aircraft power based on a number of sources,
   determining a health status of a load within said load set, said health status indicative of whether said load is malfunctioning;
   providing power to only those loads within said load set that are not deemed to be malfunctioning; and
   removing an unpowered redundant load from said load set.

8. The method of claim 7 wherein determining said health status of said load includes comparing normal power consumption of said load with actual power consumption of said load, and deeming said load as malfunctioning if the normal power consumption of the load differs from the actual power consumption of said load by a predetermined amount.

9. The method of claim 8 further comprising deeming said load to be malfunctioning if said load is drawing too much current.

10. The method of claim 8 further comprising deeming said load to be malfunctioning if said load is drawing too little current.

11. The method of claim 7 further comprising:
    removing a malfunctioning load from said load set.

12. The method of claim 11 further comprising:
    adding a properly functioning load relating to said malfunctioning load to said load set.

13. The method of claim 12, wherein the added properly functioning load is a back-up load for the removed malfunctioning load.

14. The method of claim 7 further comprising:
    diminishing a number of loads included in said load set if a number of generators is less than a number of generators carried by an aircraft.

15. The method of claim 14 further comprising:
    further diminishing said number of loads included in said load set if said number of generators further diminishes.

16. The method of claim 15 further comprising:
    further diminishing said number of loads included in said load set if said aircraft is running on battery power only.

17. The method of claim 14 further comprising:
    further diminishing said number of loads included in said load set if said aircraft is running on battery power only.

18. The method of claim 14, wherein said load set includes flight controls and communication gear.

19. The method of claim 7, wherein the health status is not generated by the load.

20. The method of claim 7 wherein determining said health status of said load includes determining whether said load is detected, and deeming said load as malfunctioning if said load is not detected.

21. The method of claim 7, wherein the health status is generated by the load.

22. The method of claim 7 wherein determining said health status of said load includes determining whether said load reports itself as malfunctioning, and deeming said load as malfunctioning if it reports itself as malfunctioning.

23. The method of claim 7, wherein the redundant load corresponds to a secondary piece of equipment which is not needed unless a primary piece of equipment is malfunctioning.

24. The method of claim 7, wherein the step of removing the unpowered redundant load from the load set is performed based on one or more load selection criteria.

25. The method of claim 24, wherein at least one of the load selection criteria is a criticality of the load.

* * * * *